US010336568B2

(12) United States Patent
Morrison et al.

(10) Patent No.: US 10,336,568 B2
(45) **Date of Patent: *Jul. 2, 2019**

(54) DE-COILING CONE

(71) Applicant: The ESAB Group, Inc., Florence, SC (US)

(72) Inventors: Mark D. Morrison, Fenton, MO (US); Gerard Klaes, Moab, UT (US); Rodolfo Francisco Rep, Hanover, PA (US); Victor Adolfo González Cortez, Greer, SC (US)

(73) Assignee: The ESAB Group Inc., Florence, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,371

(22) Filed: Sep. 11, 2018

(65) Prior Publication Data

US 2019/0002232 A1 Jan. 3, 2019

Related U.S. Application Data

(63) Continuation of application No. 15/625,185, filed on Jun. 16, 2017, now Pat. No. 10,087,036.

(Continued)

(51) Int. Cl.
*B23K 9/133* (2006.01)
*B23K 9/173* (2006.01)

(Continued)

(52) U.S. Cl.
CPC ........... *B65H 57/18* (2013.01); *B23K 9/1333* (2013.01); *B23K 9/173* (2013.01); *B65H 49/02* (2013.01);

(Continued)

(58) Field of Classification Search
CPC ........ B65H 57/18; B65H 49/02; B65H 49/12; B65H 49/14; B65H 2701/36; B23K 9/1333
See application file for complete search history.

(56) References Cited

U.S. PATENT DOCUMENTS 3,664,601 A 5/1972 Richardson, Jr.
4,651,948 A 3/1987 Delehouzee et al.

(Continued)

FOREIGN PATENT DOCUMENTS

WO 9852844 A1 11/1998
WO WO-9852844 A1 * 11/1998 ............. B65D 85/04

OTHER PUBLICATIONS

Notification of Transmittal of International Search Report and Written Opinion including International Search Report and Written Opinion for PCT/US2018/022304 dated Jul. 4, 2018, 14 pages.

*Primary Examiner* — William A. Rivera
(74) *Attorney, Agent, or Firm* — Edell, Shapiro & Finnan, LLC

(57) ABSTRACT

A system for dispensing weld wire comprises a container including walls and inside corners, a coil of weld wire within the container, and a de-coiling cone on the weld wire. The coil includes inner and outer circumferences, and the de-coiling cone includes an inner ring smaller than the inner circumference of the coil, an outer ring larger than the inner circumference and smaller than the outer circumference of the coil, and a plurality of legs extending radially outward from the inner ring to positions adjacent respective inside corners of the container. Each leg includes a first leg portion connecting the inner and outer rings, a second leg portion extending radially outwardly from the first leg portion, and a backwardly bent leg portion adjacent a corresponding inside corner of the container.

14 Claims, 5 Drawing Sheets

Related U.S. Application Data

(60) Provisional application No. 62/476,185, filed on Mar. 24, 2017.

(51) Int. Cl.
*B65H 49/02* (2006.01)
*B65H 49/08* (2006.01)
*B65H 57/18* (2006.01)

(52) U.S. Cl.
CPC ......... *B65H 49/08* (2013.01); *B65H 2701/36* (2013.01)

(56) References Cited

U.S. PATENT DOCUMENTS

| | | | | |
|---|---|---|---|---|
| 4,763,854 | A | 8/1988 | Borowski | |
| 5,277,314 | A | 1/1994 | Cooper et al. | |
| 7,198,152 | B2 | 4/2007 | Barton et al. | |
| 7,398,881 | B2 | 7/2008 | Barton et al. | |
| 7,410,111 | B2 | 8/2008 | Carroscia | |
| 7,798,326 | B2 | 9/2010 | Hsu | |
| 8,313,054 | B2 | 11/2012 | Carroscia et al. | |
| 8,752,782 | B2 | 6/2014 | Matthews, III | |
| 8,936,210 | B2 | 1/2015 | Ma | |
| 8,967,520 | B2 | 3/2015 | Matthews, III et al. | |
| 9,193,558 | B2 | 11/2015 | Matthews et al. | |
| 9,260,269 | B2 | 2/2016 | Weissbrod et al. | |
| 10,087,036 | B1 * | 10/2018 | Morrison | B23K 9/1333 |
| 2004/0155090 | A1 | 8/2004 | Jensen | |
| 2011/0186677 | A1 | 8/2011 | Carroscia et al. | |
| 2013/0193257 | A1 | 8/2013 | Matthews et al. | |

* cited by examiner

DE-COILING CONE

CROSS-REFERENCE TO RELATED APPLICATIONS

This application is a continuation of U.S. patent application Ser. No. 15/625,185, filed on Jun. 16, 2017, which claims the benefit of U.S. Provisional Patent Application No. 62/476,185, filed on Mar. 24, 2017, the disclosures of which are incorporated by reference herein in their entirety.

TECHNICAL FIELD

The present disclosure relates generally to containers for dispensing weld wire and, more particularly, to a de-coiling cone for such containers.

BACKGROUND

In many high production welding environments, weld wire is delivered to the point of use in a container, such as a drum. The drum contains a coil of wire long enough to support high production welding operations for an extended period of time.

A de-coiling cone may be used to help feed wire out of the drum. A typical de-coiling cone includes three concentric rings—an inner ring through which the wire is fed, an outer ring adjacent the walls of the drum, and an intermediate ring disposed between the inner and outer rings. The rings are arranged at different heights and connected by legs or spokes that extend radially outward and downwardly from the inner ring to the outer ring to define a cone-like profile. The de-coiling cone rests on top of a cardboard ring, which rests on the coil of welding wire inside the drum. The welding wire is consumed as the welding feed system pulls the wire out of the drum through the inner ring of the de-coiling cone. The de-coiling cone and cardboard ring ride on top of the wire, dropping lower into the drum as the wire is consumed.

Customers expect to continuously feed the wire into their weld system until the drum is empty. However, tangles occasionally occur inside the drums. In some applications, particularly those with larger diameter wire, or with stiffer wire alloys, the wire tends to tangle due to twist induced in the wire by the customer feeding system. One of the most common types of tangles observed in the field occurs when the weld wire moves up above the de-coiling cone, between the de-coiling cone and the inner liner of the drum, while the end user is welding. When that happens, the wire eventually gets caught on the de-coiling cone, causing feeding to stop, and operator intervention is required.

SUMMARY OF THE INVENTION

An aspect of the present invention comprises a system for dispensing weld wire. The system comprises a container including a plurality of walls defining a plurality of inside corners, a coil of weld wire disposed within the container, and a de-coiling cone disposed on top of the coil of weld wire. The coil of weld wire includes an outer circumference adjacent the plurality of walls and an inner circumference defining a central opening The de-coiling cone includes an inner ring having a first diameter smaller than the inner circumference of the coil of weld wire, an outer ring having a second diameter larger than the first diameter and smaller than the outer circumference of the coil of weld wire, and a plurality of legs extending radially outward from the inner ring to positions adjacent the inside corners of the container and connecting the inner and outer rings. Each of the plurality of legs includes a first leg portion connecting the inner ring to the outer ring, a second leg portion extending radially outwardly from the first leg portion, and a backwardly bent leg portion adjacent a corresponding inside corner of the container. In an example embodiment, each leg may include a third leg portion that extends vertically upward from the horizontal first leg portion, and the backwardly bent leg portion may extend radially inwardly and downwardly from the third leg portion.

Another aspect of the present invention comprises a de-coiling cone for dispensing wire from a container. The de-coiling cone comprises an inner ring having a first diameter, an outer ring having a second diameter larger than the first diameter, and a plurality of legs extending radially outward from the inner ring and connecting the inner and outer rings. Each of the plurality of legs includes a first leg portion connecting the inner ring to the outer ring, a second leg portion extending radially outwardly from the first leg portion, and a backwardly bent leg portion. In an example embodiment, each leg may include a third leg portion that extends vertically upward from the horizontal first leg portion, and the backwardly bent leg portion may extend radially inwardly and downwardly from the third leg portion.

DESCRIPTION OF EXAMPLE EMBODIMENTS

Figure 1:
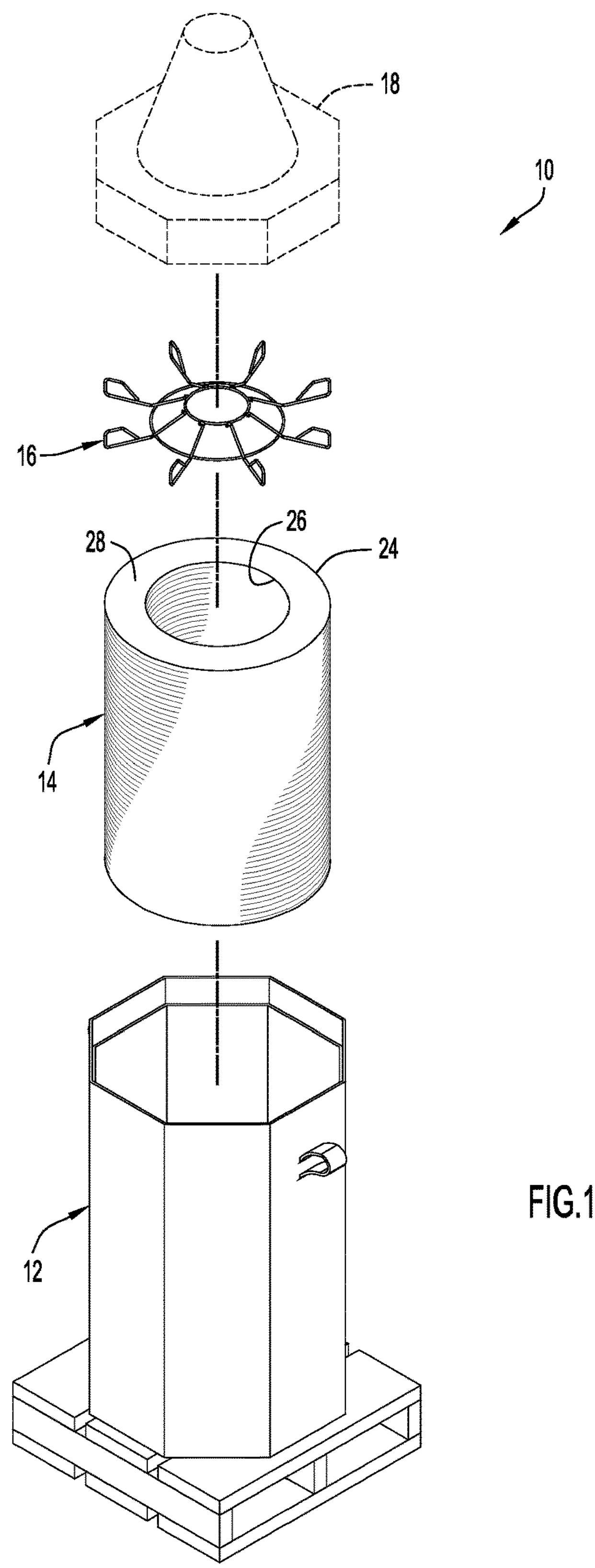
FIG. 1 is an exploded perspective view of an exemplary system for dispensing weld wire from a container according to an embodiment of the present invention.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean "serving as an example, instance or illustration." Any embodiment of construction, process, design, technique, etc., designated herein as exemplary is not necessarily to be construed as preferred or advantageous over other such embodiments.

Figure 2:
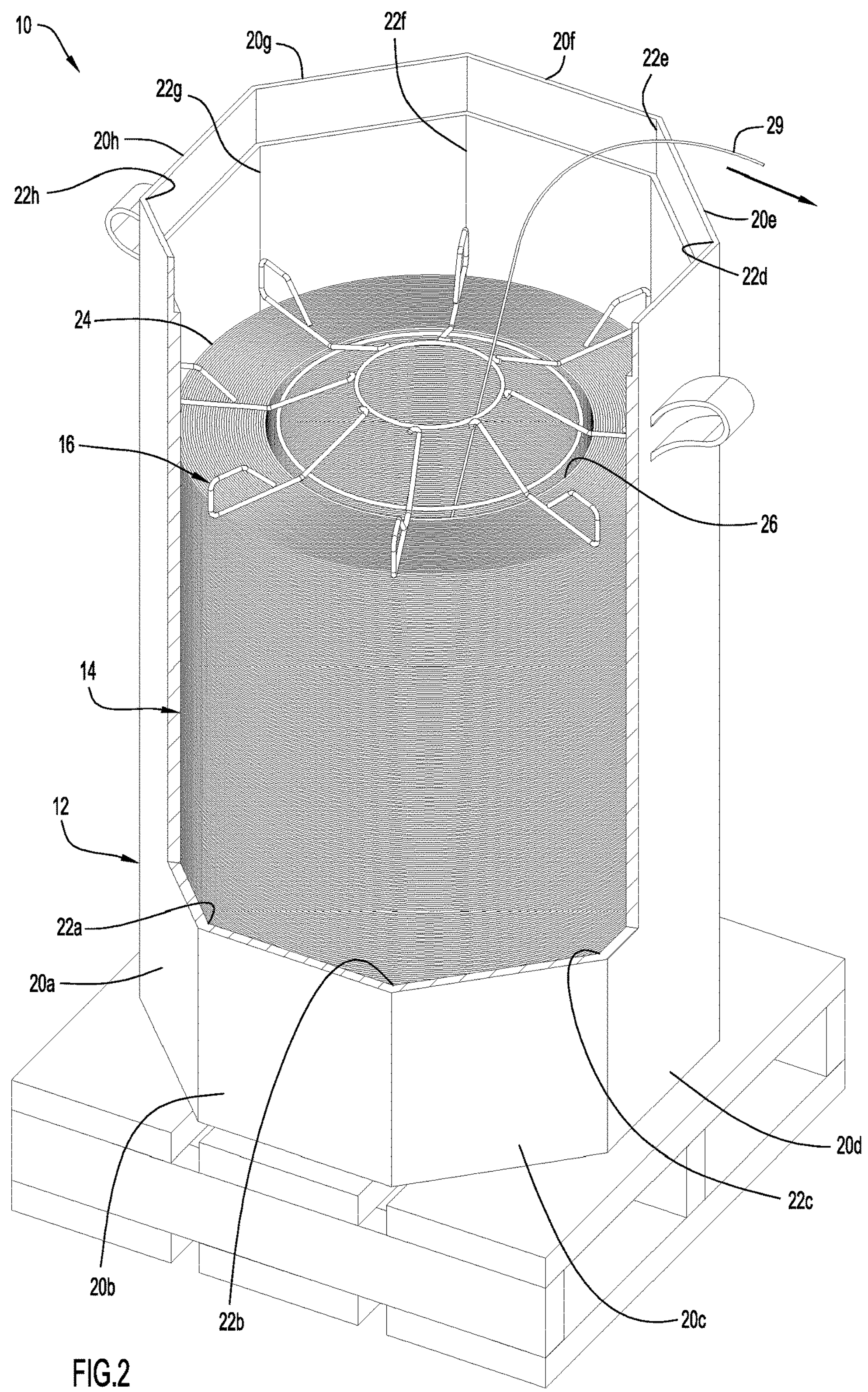
FIG. 2 is a perspective view of the embodiment of FIG. 1, with the container partially cut-away to show details of the de-coiling cone and the coil of weld wire.
Figure 3:
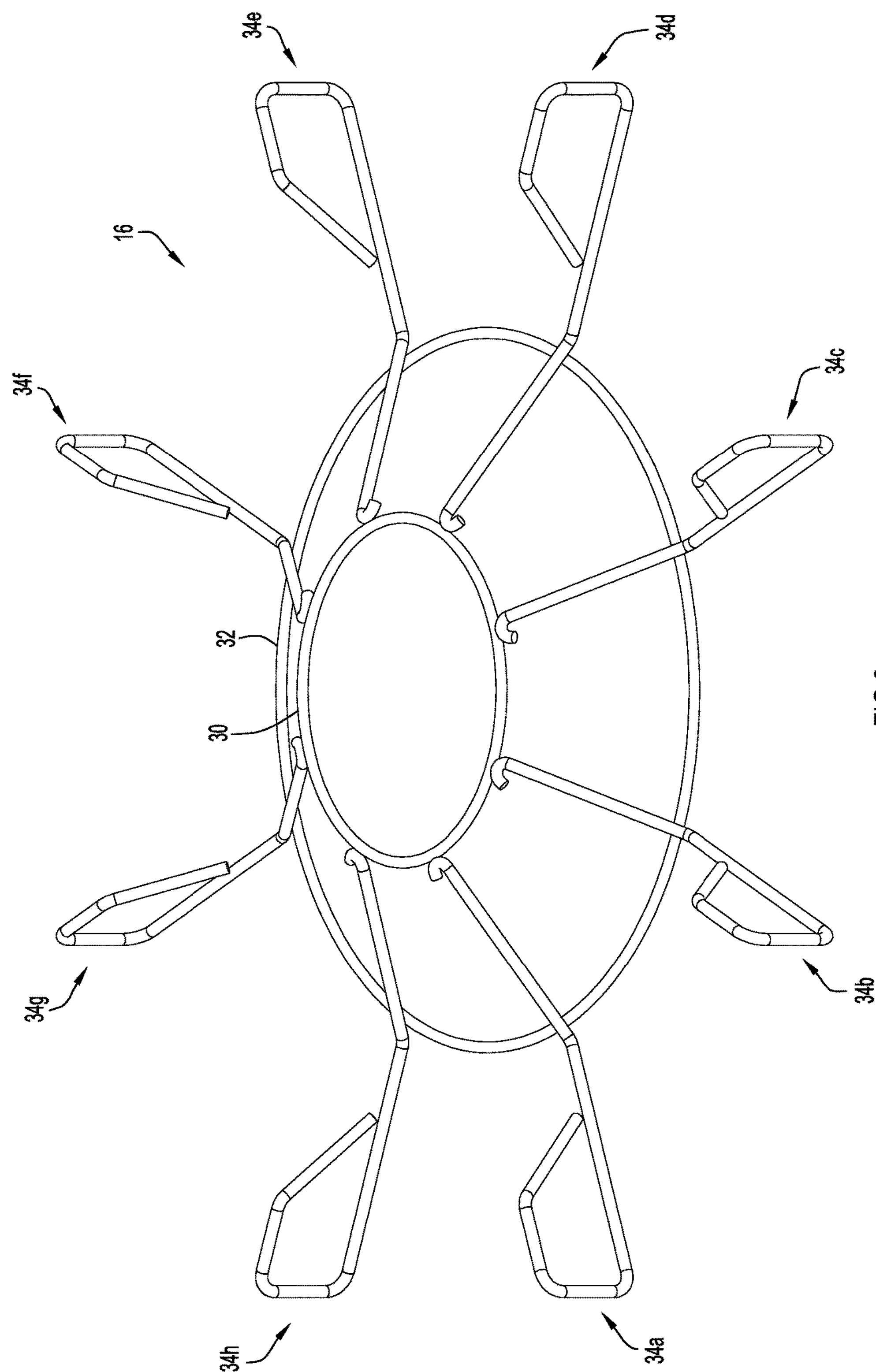
FIG. 3 is a perspective view of a de-coiling cone for use in dispensing weld wire from a container according to an embodiment of the present invention.

A system 10 for dispensing continuous running weld wire from a container according an embodiment of the present invention is shown in FIGS. 1 and 2. The system 10 includes a container 12, a coil of weld wire 14 disposed within the container, and a de-coiling cone 16. The system may also include a lid 18. The container 12 includes a plurality of walls 20*a*-*h* defining a plurality of inside corners 22*a*-*h*. In an exemplary embodiment, the container is a drum with an octagonal cross-section defined by eight vertical walls and having eight inside corners. The coil of weld wire 14 has a generally cylindrical configuration and includes an outer circumference 24 adjacent the plurality of walls and an inner circumference 26 defining a central opening. The coil of weld wire 14 also has a generally flat top 28. The de-coiling cone 16 rests directly on top of the coil of weld wire within the container, and weld wire 29 from the coil may be fed through the de-coiling cone as shown.

As best seen in FIGS. 3-6, the de-coiling cone 16 includes an inner ring 30, an outer ring 32, and a plurality of legs 34*a*-*h*. In an exemplary embodiment, the number of legs is equal to the number of inside corners of the container. For example, a de-coiling cone for an octagonal container may have eight legs as shown. Inner ring 30 is disposed in a first plane $P_1$, and outer ring 32 is disposed in a second plane $P_2$ below the first plane. Planes $P_1$ and $P_2$ are preferably parallel as shown. Inner ring 30 has a diameter $D_1$, and outer ring 32 has a second diameter $D_2$ larger than $D_1$. The inner and outer rings 30 and 32 are preferably concentric. The legs 34*a*-*h* extend radially outwardly from angularly spaced locations around the inner ring 30 to connect with the outer ring 32 and extend radially outwardly from the outer ring.

Figure 6:
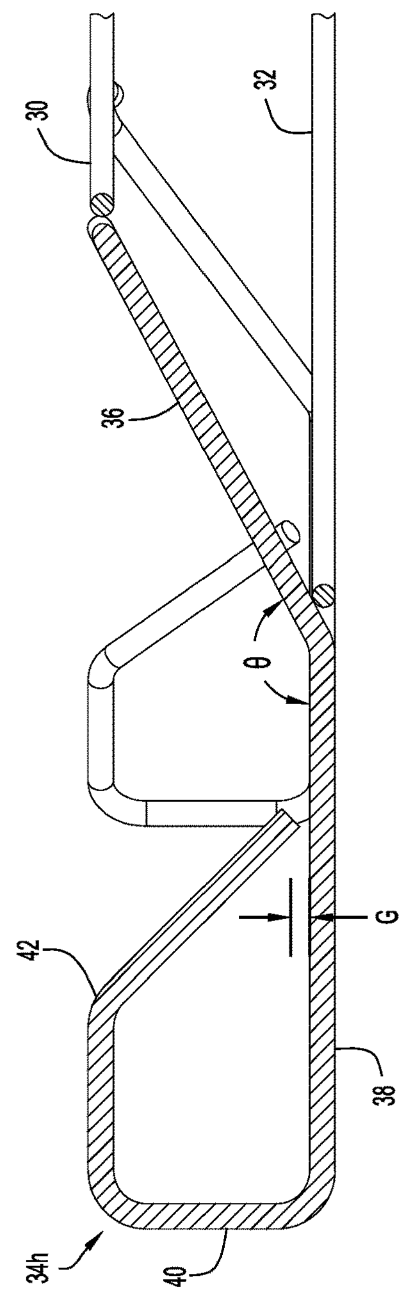
FIG. 6 is a cross-sectional view of a portion of a de-coiling cone taken through line 6-6 in FIG. 4.

As best seen in FIG. 6, each of the plurality of legs includes an angled first portion 36 connecting the inner ring 30 to the outer ring 32, a horizontal (or flat) second portion 38 extending radially outwardly from the outer ring, a third portion 40 extending upwardly from the horizontal portion, and a backwardly bent fourth portion 42 extending radially inwardly and downwardly from the horizontal part. While the third portion is shown extending vertically upward from the second portion, it will be appreciated that the third portion may be curved to provide a smoother and/or rounded transition between the horizontal leg portion and the backwardly bent portion.

The backwardly bent portion extends the effective length of each leg, thereby increasing the overall weight of the de-coiling cone, which allows the de-coiling cone to lay flat on the coil of weld wire during de-coiling operations without the need for an intermediate member (such as a cardboard ring) between the de-coiling cone and the coil of weld wire. The backwardly bent portion also helps eliminate sharp edges that can catch on the container and prevent the de-coiling cone from moving properly and maintaining contact with the coil as the weld wire is consumed. A tip of the backwardly bent portion 42 may touch the horizontal portion 38, or it may be spaced slightly above the horizontal portion with a small gap G therebetween as shown, to discourage wire from becoming tangled in the legs. The gap G is preferably no more than twice the thickness of the weld wire in the container (e.g., no more than about 0.125 inch for typical MIG wire). In another embodiment, the tip of the backwardly bent portion 42 may be welded or otherwise attached to the horizontal portion 38 to eliminate the possibility of any gap.

While the backwardly bent leg portion is shown having a first horizontal part that extends radially inwardly from the vertical leg portion and a second angled part that extends radially inwardly and downwardly from the first horizontal part, it will be appreciated that the backwardly bent leg portion may have other configurations, including but not limited to a single angled part that extends radially inwardly and downwardly from the vertical leg portion, a continuously curved configuration (e.g., a spiral configuration), a configuration with multiple bends (e.g., a zig-zag configuration), a rectangular configuration, etc. In an example embodiment, a length of the backwardly bent leg portion may be at least as long as the horizontal portion, thereby significantly increasing the weight of the de-coiling cone.

Respective bottom surfaces of the horizontal leg portions 38 are preferably in the same plane. In an exemplary embodiment, a bottom surface of the outer ring 32 is also in the same plane as the bottom surfaces of the horizontal leg portions 38.

Figure 4:
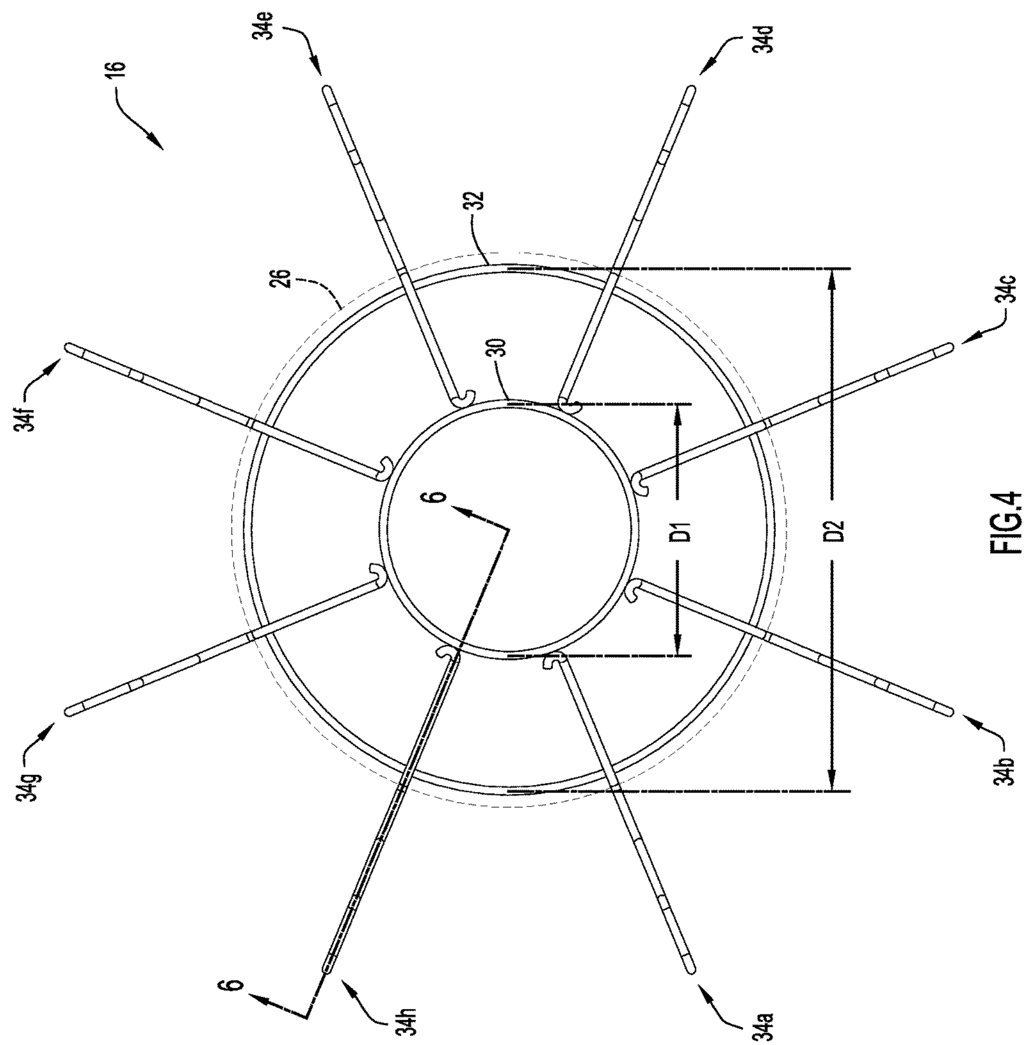
FIG. 4 is a top view of a de-coiling cone as shown in FIG. 3.
Figure 5:
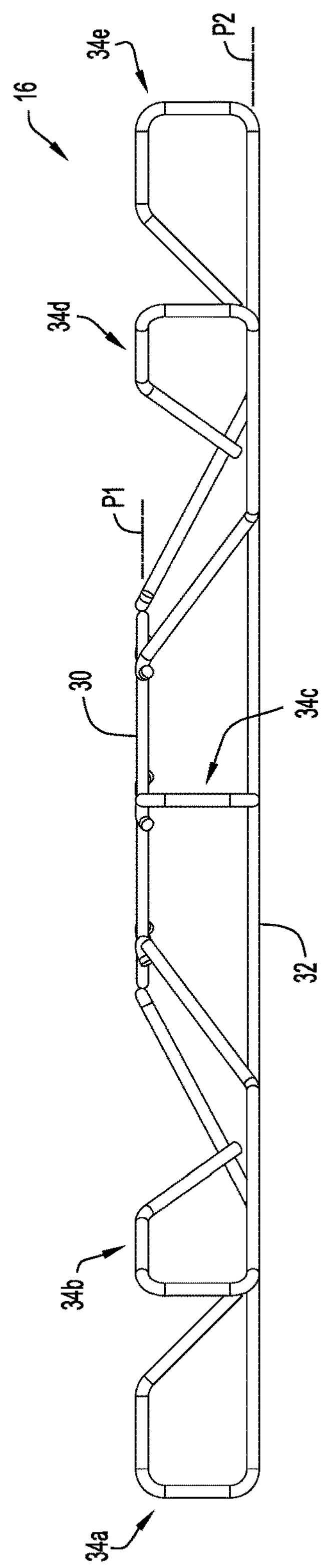
FIG. 5 is a side view of a de-coiling cone as shown in FIG. 3.

As best seen in FIGS. 2 and 4, the diameter $D_2$ of the outer ring 32 may be smaller than the inner circumference 26 of the coil of weld wire 14, and the plurality of legs 34*a*-*h* may extend radially outward from the outer ring to positions adjacent corresponding inside corners of the container 12 such that only the legs are disposed directly above the coil of weld wire. Configuring the outer ring of the de-coiling cone to be slightly smaller than the inner circumference of the coil of weld wire (e.g., about 0.5 inch smaller) encourages the weld wire to slide smoothly across this ring as the wire is pulled up and out of the container. Also, if the walls of the container are deformed, they are less likely to contact the outer ring and impede the de-coiling cone from moving downwardly in the container as the wire is consumed. In an exemplary embodiment, suitable for most weld wire, the inner ring may have a diameter of about 5.75 inches and the outer ring may have a diameter of about 12.38 inches, with a vertical spacing of about 2 inches between the inner and outer rings so that the angle θ between the angled leg portion 36 and the horizontal leg portion 38 of each leg (see FIG. 6) allows for smooth feeding. In an exemplary embodiment, the angle θ between the angled and horizontal portions of each leg is about 152° (±a few degrees). In an exemplary embodiment, the number of legs is equal to the number of inside corners of the container and the length of each leg is configured to position the vertical portion 40 at the end of the leg adjacent a respective inside corner of the container to limit lateral movement of the de-coiling cone in the container and discourage wire from rising above the de-coiling cone in the corners. In an example embodiment, the ends of the legs (e.g., vertical portions 40) are immediately adjacent respective inside corners of the container but are slightly spaced therefrom by a gap small enough to prevent the de-coiling cone from rotating more than a few degrees while discouraging contact with the corner that may result in binding. In an example embodiment, the horizontal portion of each leg has a length that is 15%-25% of the diameter of the outer ring, and preferably about 20% of the diameter of the outer ring.

In an exemplary embodiment, components of the de-coiling cone of the present invention may be formed of steel wire and welded together. For example, galvanized wire with a round cross-section may be used. While other materials and manufacturing methods may be used, it is important that the weight of the de-coiling cone be sufficient to avoid being lifted off the coil of weld wire or otherwise displaced during de-coiling operations. We have found that a cone weight of about 1.6-2.0 pounds is sufficient for most weld wire, although the de-coiling cone may be configured to be lighter or heavier if desired.

The descriptions above are intended to illustrate possible implementations of the present inventive concept and are not restrictive. Many variations, modifications and alternatives will become apparent to the skilled artisan upon review of this disclosure. For example, while a container with eight walls is shown, it will be appreciated that the container may include fewer or more than eight walls. The container may also be disposed with an outer container of different cross-sectional shape, such as a square cross-section. While it is preferred that the de-coiling cone have the same number of legs as the number of inside corners of the container, the cone may have fewer or more legs than the number of inside corners. Additionally, while the de-coiling cone is configured to rest directly on the coil of weld wire without the need for any intermediate member (such as a cardboard ring) therebetween, a cardboard ring may be placed between the de-coiling cone and the coil of weld wire. Also, while a de-coiling cone with only two concentric rings is preferred to minimize manufacturing costs and inhibit contact between the walls of the container and the de-coiling cone, a third concentric ring of larger diameter may be placed above the legs to add weight to the de-coiling cone, particularly if the diameter of the third ring is such that there is sufficient room between the ring and the walls of the container to limit the possibility of contact therebetween in the event of wall deformation. Thus, it will be appreciated that components equivalent to those shown and described may be substituted therefor, elements and methods individually described may be combined, and elements described as discrete may be distributed across many components. The scope of the invention should therefore be determined not with reference to the description above, but with reference to the appended claims, along with their full range of equivalents.

The invention claimed is:

1. A system for dispensing weld wire comprising:

a container;

a coil of weld wire disposed within the container; and a de-coiling cone disposed within the container above the coil of weld wire, the de-coiling cone including an inner ring, an outer ring, and a plurality of legs;

wherein the inner ring is connected with the outer ring;

wherein each of the plurality of legs includes a horizontal leg portion extending outwardly from the outer ring and a backwardly bent leg portion coupled with the horizontal leg portion; and wherein a gap between a tip of the backwardly bent leg portion and the horizontal leg portion of the leg is less than a vertical distance between the inner and outer rings.

2. The system of claim 1, wherein the gap between the tip of the backwardly bent leg portion and the horizontal leg portion is no larger than twice a thickness of the weld wire.

3. The system of claim 1, wherein the backwardly bent leg portion is disposed above the horizontal leg portion.

4. The system of claim 1, wherein the backwardly bent leg portion extends inwardly and downwardly towards the horizontal leg portion.

5. A system for dispensing weld wire comprising:

a container;

a coil of weld wire disposed within the container; and a de-coiling cone disposed within the container above the coil of weld wire, the de-coiling cone including an inner ring, an outer ring, and a plurality of legs;

wherein the inner ring is connected with the outer ring;

wherein each of the plurality of legs includes a horizontal leg portion extending outwardly from the outer ring to a backwardly bent leg portion;

wherein a tip of the backwardly bent leg portion is disposed adjacent the horizontal leg portion of the leg, and wherein the tip of the backwardly bent leg portion is in contact with the horizontal leg portion.

6. The system of claim 5, wherein the tip of the backwardly bent leg portion is attached to the horizontal leg portion.

7. The system of claim 5, wherein the tip of the backwardly bent leg portion is welded to the horizontal leg portion.

8. A de-coiling cone for dispensing weld wire from a container, the de-coiling cone comprising:

a first ring;

a second ring disposed below the first ring; and a plurality of legs;

wherein the first ring is connected with the second ring;

wherein each of the plurality of legs includes a horizontal leg portion extending outwardly from the outer ring and a backwardly bent leg portion coupled with the horizontal leg portion; and wherein a gap between a tip of the backwardly bent leg portion and the horizontal leg portion of the leg is less than a vertical distance between the inner and outer rings.

9. The de-coiling cone of claim 8, wherein the gap between the tip of the backwardly bent leg portion and the horizontal leg portion is no larger than twice the thickness of the weld wire.

10. The de-coiling cone of claim 8, wherein the backwardly bent leg portion is disposed above the horizontal leg portion.

11. The de-coiling cone of claim 8, wherein the backwardly bent leg portion extends inwardly and downwardly towards the horizontal leg portion.

12. A de-coiling cone for dispensing weld wire from a container, the de-coiling cone comprising:

a first ring;

a second ring disposed below the first ring; and a plurality of legs;

wherein the first ring is connected with the second ring;

wherein each of the plurality of legs includes a horizontal leg portion extending outwardly from the second ring to a backwardly bent leg portion;

wherein a tip of the backwardly bent leg portion is disposed adjacent the horizontal leg portion of the leg, and wherein the tip of the backwardly bent leg portion is in contact with the horizontal leg portion.

13. The de-coiling cone of claim 12, wherein the tip of the backwardly bent leg portion is attached to the horizontal leg portion.

14. The de-coiling cone of claim 12, wherein the tip of the backwardly bent leg portion is welded to the horizontal leg portion.

* * * * *